April 17, 1962     E. A. LEITZ ETAL     3,029,720
VIEW FINDER
Filed Aug. 25, 1959     2 Sheets-Sheet 1

INVENTORS
ERNST A. LEITZ
ROBERT ECKHARDT
By Toulmin & Toulmin
Attorneys

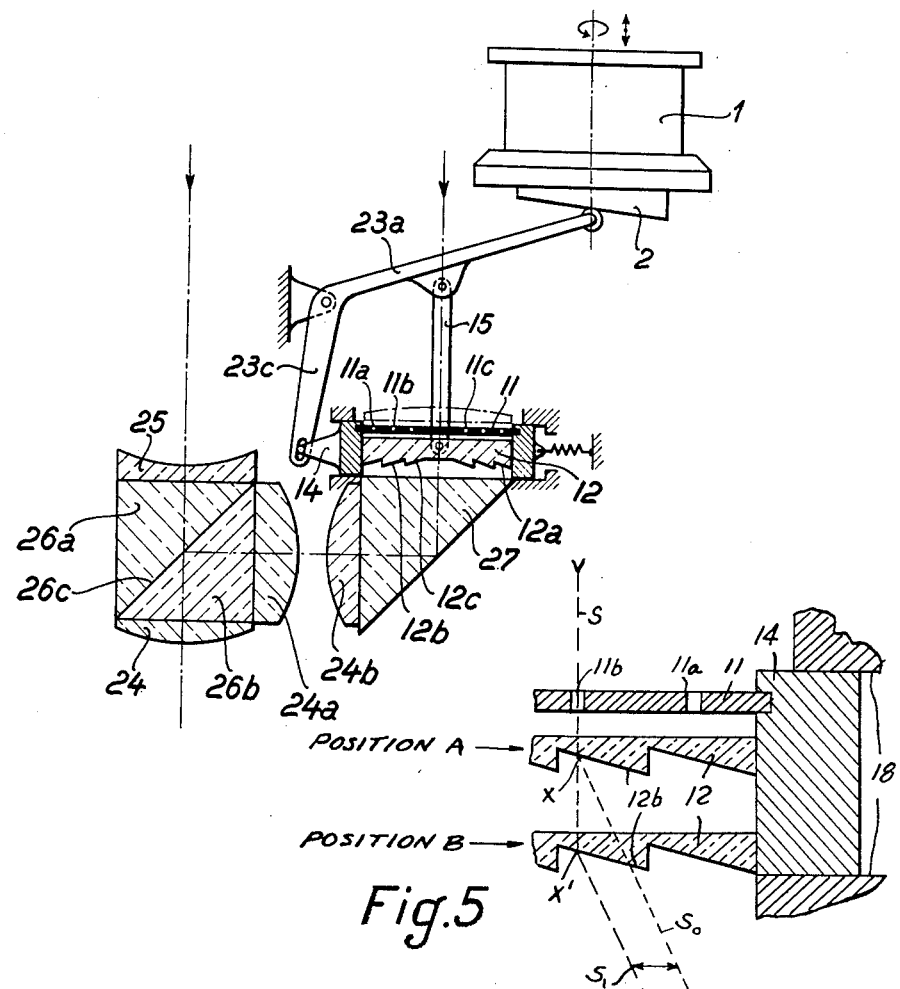

3,029,720
VIEW FINDER

Ernst A. Leitz, Wetzlar (Lahn), and Robert Eckhardt, Leun (Lahn), Germany, assignors to Ernst Leitz Gesellschaft mit beschrankter Haftung, Wetzlar, Germany
Filed Aug. 25, 1959, Ser. No. 835,893
Claims priority, application Germany Aug. 29, 1958
7 Claims. (Cl. 95—44)

The present invention relates to photographic cameras. More in particular, the present invention relates to view finders and range finders in photographic cameras and more particularly still to view finders or range finders of the type in which a plurality of image field boundaries are provided for various focal lengths of the objective lens.

Range finders and measuring range finders of the last-mentioned type are known in the art. In such range finders, the image boundaries are provided on an index plate which is displaceably disposed in the direction of its flat plane depending on the setting of the objective in order to adjust the range finder parallax. Such range finders have fixed optical members in their viewing telescope not permitting an adjustment to the varying focusing distances. As a consequence, the image field boundaries define the area which is seen by the objective lens correctly only for one particular focusing distance. For all other focusing distances of the objective lens there is a discrepancy between the image field actually perceived by the objective lens and the field of view marked in the range finder by the image field boundaries. For example when the objective is focused for infinity the size of the image field actually perceived by the objective lens system may precisely be defined by the image field boundaries in the range finder. For all other i.e. shorter focusing distances of the objective the image field defined by the image field boundaries in the range finder is of larger size than the image field actually perceived by the objective lens system and reproduced on the film in the camera. This phenomenon can be described as "image shrinkage" or "image size shrinkage." Consequently, it is entirely uncertain to any person using a photographic camera equipped with any of these known range finders or measuring range finders, whether all objects which appear within the limits of the image field boundaries in the range finder are actually perceived by the objective lens and are reproduced in the photographic picture taken with the camera.

With the foregoing in mind it is an object of the present invention to provide a view finder and a range finder for photographic cameras of the type in which a plurality of image field boundaries can be produced for various focal lengths of the objective lens, which comprises means for adjusting the image field defined by the boundaries in the range finder and the image field actually perceived by the objective lens system and reproduced in the photographic picture, so as to eliminate any discrepancy between the image field as defined in the range finder and the image field actually perceived by the objective lens and reproduced in the photographic picture. In other words, it is an object of the invention to compensate or eliminate the above mentioned phenomenon of "image shrinkage."

While the range finder image does not change in size, the object to be reproduced by the camera changes in size as the objective is sharply focused.

This object is achieved by the view finder or range finder of the present invention of the type referred to, and which comprises a wedge plate of glass or the like transparent material provided with refracting wedge-shaped protrusions, which plate is hereinafter referred to as a "wedge-plate." This wedge plate is disposed between the index plate with the image field boundaries and the optical collimator lens means. The transparent plate can be axially displaced relative to the index plate corresponding to the adjustment of the lens system to various focusing distances. The wedge plate has on one of its large surfaces a plurality of wedge-shaped protrusions with angles of refraction such that upon axial displacement of the wedge plate, light rays are shifted in directions of the plane of extension of this plate, which in turn, shifts the virtual images of the boundary lines so that the frame appears at different sizes in the range finder-viewer. Thus any discrepancy between the image as defined by the image field boundaries in the range finder and the picture actually perceived by the objective and reproduced by the camera is compensated.

Depending on the distance between the wedge-shaped protrusions of the wedge plate and the index plate the image field boundaries appear in the image field of the range finder in a different size than it would appear without using the wedge plate.

Preferably, the wedge plate is adjusted depending on the focusing movement of the objective. The refractory power of the deflecting wedge-shaped protrusions is so chosen that for each focusing position of the objective the correct image field boundaries are obtained in the image field of the range finder. Where the image field boundaries are marked by a plurality of frame-like lines the deflecting wedges also form a plurality of wedge-shaped frame-like configurations which frames are concentrically disposed corresponding to the image field boundaries. In cameras where the index plate can be displaced in its plane in order to compensate the range finder parallax the wedge plate is adapted to follow this movement of the index plate. At the same time the wedge plate is axially adjustable relative to the index plate.

In case of poor illumination the index plate can be provided with an illuminating lens; it is also possible to provide the largest of the image field boundaries with wedge elements having a reversed refractory power with respect to the corresponding wedge-shaped protrusions of the wedge plate.

According to a further feature of the invention a wedge plate can be pressed from glass or plastic material having substantially the same clearness and transparency as glass. Furthermore, the wedge plate can be integrally colored in order to serve as a contrast filter for the image field boundaries.

The invention will be more fully appreciated upon the following description of the accompanying drawings, wherein FIGURE 1 is a longitudinal, somewhat schematic front view of a range finder of the present invention in which the distance measuring means are coupled with the exchangeable objective of a photographic camera;

FIGURE 4 shows in longitudinal, somewhat schematic front view the application of the present invention to a view finder of a camera not combined with a distance meter; and FIG. 5 shows an enlarged portion of FIG. 2 with the wedge plate illustrated in two different positions.

Figure 1:
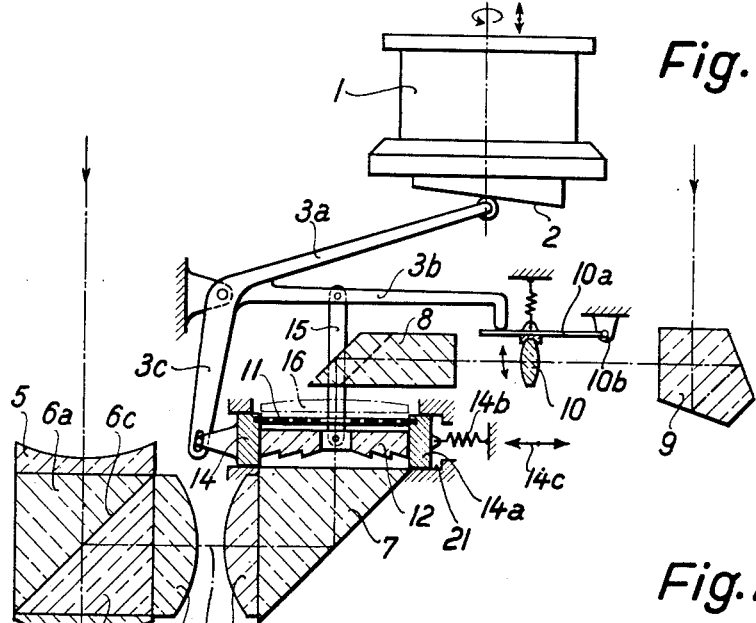

Referring now to the drawings somewhat more in detail and turning first to FIGURE 1, the exchangeable objective 1 of a photographic camera (not shown) can be adjusted by turning an adjusting ring clockwise or counter-clockwise for the purpose of being sharply focused. The objective 1 is in sensitive communication via its guide surface 2 with the feeling lever 3a of a range finder system. This range finder system comprises, for example, the lens system 4, 5, the optimal mixers 6a, 6b, the semi-translucent specular surface 6c, the deflecting prisms 7, 8, 9, the telescope objective 10, mounted in a resiliently mounted lever 10a adapted for a swivelling motion about fulcrum 10b, and the lenses 4a and 4b disposed in the path of measuring rays indicated by line 4c.

The telescope objective 10 produces an intermediate image in the plane in which there extends an index plate 11 having apertures or slots 11a, 11b, 11d, and 11c, permitting the passage of light. The apertures 11a, for example, define a rectangle, the apertures 11b define another rectangle etc. These rectangles constitute frames defining the image field with its boundaries. This intermediate image is viewed by the optical lens system 4, 4a, 4b. The same optical lens system is used for viewing the image field boundaries provided on the index plate 11, in a collimator-like fashion. The distance measuring is effected by the swivelling motion of the telescope objective 10, which motion is produced by the action of the lever arm 3b acting against the outer end of lever 10a with its one bent-end and being connected with its outer end with its feeling lever 3a responding to the revolving motion of objective 1, the telescope objective 10 thus being displaced in response to the turning of objective 1.

The index plate 11 is mounted in the support 14 being under the influence of a tension spring 14b, and being hingedly connected to lever arm 3c, the latter being a curved elongation of lever arm 3a. The displacement of the index plate 11 is thus effected in response to the turning of objective 1 and compensates the parallax of the range finder. The displacement is effected in the directions indicated by arrow 14c.

Measuring range finders of the type just described are known in the art. It is known (see U.S. Patent 2,805,608) to have the index plate provided with slots defining several frames for different image fields. Each of such frames pertains to a particular objective of given focal length. Furthermore, there is provided a mask plate to shut off those slots and frames not presently needed for the objective then attached to the camera. Upon a change of the objective this mask is shifted and a different frame becomes visible in the view finder. Such arrangement is also to be employed in the device of the instant invention but has been omitted for the sake of clarity, and it is understood, that only one of the apertures 11a, 11b, 11c is visible in the view finder at the same time. It is also known to translate the adjusting motion of objective 1 to the objective 10 and the index plate 11 in another manner, for example, as described in U.S. Patent 2,805,608. It is also possible to make the prism 9 displaceable in lieu of that of the telescope objective 10. It is also possible to use, in connection with the present invention to be described presently, a measuring range finder in which there is no intermediate image produced of the measured image. Furthermore, the parallax of the range finder can be compensated by other known means, for example, Abbat wedge.

The particular features of the present invention will next be described. A wedge plate 12 is associated with the index plate 11, it also being mounted in the support and being positioned parallel to the index plate with respect to its large surface. The wedge plate 12 is disposed between the index plate 11 and the optical collimator lens system 4, 4a, 4b. It is composed of glass or a transparent material having substantially the same transparency as glass, and is provided with a plurality of wedge-shaped protrusions 12a, 12b, 12c, at the surface opposite to the large surface facing the index plate 11, the wedge shaped protrusion 12b for example, defining a rectangle on this plate 12 disposed adjacent the apertures 11b.

The wedge plate 12 can be displaced along the guide surface 13 on the support 14, in axial direction with respect to the index plate 11. The axial displacement is done by means of the guide rod 15 connected with one of its ends to the wedge plate 12 and hinged with the other end at the lever arm 3b, the latter being connected with the feeling lever 3a.

The axial displacement of wedge plate 12 provides for the elimination of the "image shrinkage" as defined above. The operation shall be explained in connection with FIG. 5.

Suppose plate 12 is in position (A) which may be the uppermost position, it can assume a light ray S (dash-dot line) entering boundary aperture 11b is refracted at X which is a surface point of wedge 12b, and this light ray then passes on as indicated in dotted line $S_0$.

If plate 12 is in position (B) which is a position more remote from plate 11 than position (A), light ray S is refracted by wedge 12b at point X', which point X' is physically the same as X with respect to plate 12 and wedge 12b, but point X' is geometrically displaced from point X with respect to plate 11, by precisely the distance characterizing position (B) of plate 12 as compared with position (A) thereof.

After refraction, the light ray continues on path $S_1$, path $S_1$ is, in the drawing, positioned to the left of ray $S_0$. Considering that the shown aperture 11b is part of a right hand boundary of index plate 11, and that ray path $S_0$ defining a visible portion of such boundary is positioned more to the right than ray path $S_1$ as shown, it will be apparent that in shifting plate 12 from position (A) to position (B), the refracted ray is shifted from $S_0$ to $S_1$, and the right hand boundary 11a appears also to shift from right to left, which actually is towards the center of plate 12 or 11 or to the center of the frame image. Considering further that the left hand side of boundary aperture 11b is symmetrical to the one shown in FIGURE 5, and that upper and lower part of boundary 11b are correspondingly symmetrically arranged with respect to the frame center (see FIGS. 2 and 3) it is apparent that a larger frame image appears in the viewer when plate 12 is in position (A), than when it is in position (B) or, in other words, in shifting plate 12 from (A) to (B) the frame image perceived through lens 4 (FIG. 1) becomes smaller.

The support 14 for the wedge plate 12 and the index plate 11 can be displaced along the guide surface 18 in the directions indicated by the arrow 18a, thereby moving the index plate 11 and the wedge plate 12 in the same direction in which their respective large surfaces extend, thereby compensating the parallax of the range finder. This displacement is effected by means of the lever arm 3c, connected with frame 14 in response to the turning motion of objective 1 translated to the feeling lever 3a.

Figure 3:
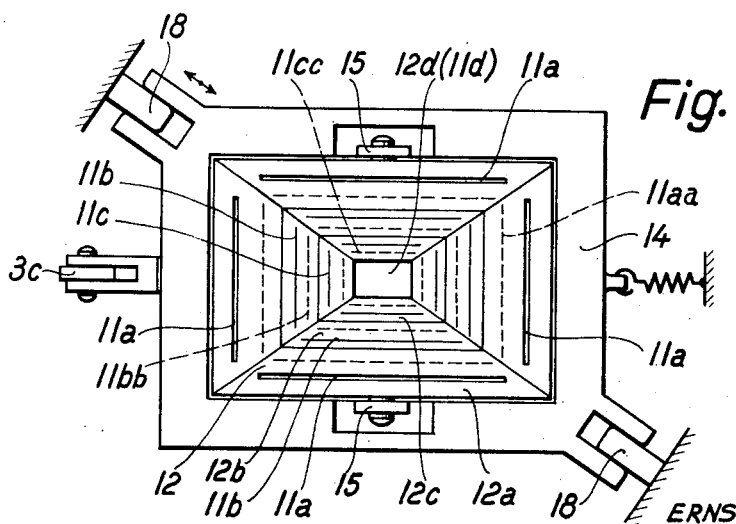
FIGURE 3 is a bottom view of the wedge plate with its guide means, focused for infinity, in the range finder of the present invention.

Upon the index plate 11 there are provided light transmitting image field boundaries constituted by lines 11a, 11b, 11c, forming frame-like configurations. In the center of the index plate 11 there is provided a central measuring window 11d. The boundary lines 11a, 11b, and 11c are interrupted at their respective corners as illustrated in FIGURE 3 that would normally constitute the 4 corners of a closed rectangle. The size of these interruptions is so chosen that, is as viewed by the corresponding wedge elements 12a, 12b, 12c of the wedge plate 12, a closed rectangle is seen only whenever the objective 1 has been adjusted to the shortest possible focussing distance. The latter instance is indicated by the dashed lines 11aa, 11bb, and 11cc in FIGURE 3. The lines 11a, 11b, and 11c are so interrupted in order to prevent their overlapping in case of the intermediate positions of the wedge plate.

The image field boundaries 11a, 11b, and 11c can be lighted by means of a window provided in the front side of the camera, the boundary lines thus being seen by the effect of the transmitted light rays.

It is, however, also possible to provide an index plate with incident light rays. If the index plate 11 is lighted through a front window in the camera, it may be necessary to keep this window comparatively small as no additional space may be available at the front side of the photographic camera. In that case, the observer is in the unfortunate position viewing the transparent image field boundaries against the dark background of unlighted portions of the camera casing surrounding the illuminating window. This is particularly the case where the image field boundaries 11a are observed defining the greatest of the fields of view. To remove this disadvantage an illuminating lens 16 can be associated with the index plate 11 as indicated by the dashed line 16 in FIGURE 1 of the drawings. It is, however, also possible to provide deflecting wedge elements 17 before the image field boundaries 11a as indicated by the dash-dotted lines in FIGURE 2 of the drawings. The power of refraction of these wedge elements must act in a direction opposite to the power of refraction of the wedge elements 12a associated with and provided for viewing the corresponding image field boundaries 11a.

The illuminating lens 16 as well as the wedge elements 17 are preferably connected with the index plate 12. However, if, as known per se, a displaceable diaphragm plate is associated with the index plate 11 for the purpose of making visible the image field boundary to the used objective, it will be found preferable to connect the illuminating lens 16 or the wedge elements 17 with this diaphragm plate and to displace them together with the latter.

The present invention is also applicable with a few modifications to a camera having a view finder not combined with a distance meter.

Figure 2:
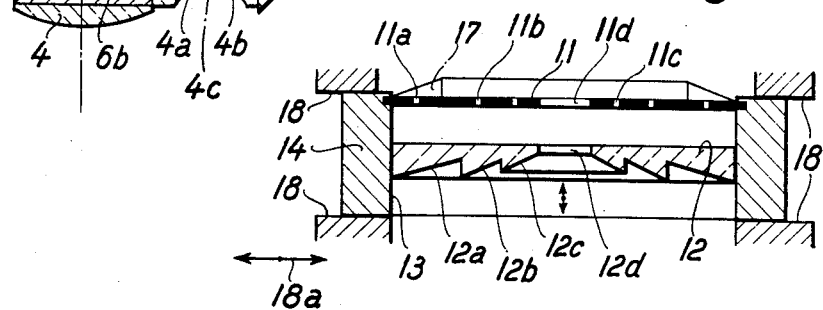
FIGURE 2 is a somewhat schematic sectional view of an index plate and a wedge plate in a range finder of the present invention.

In FIGURE 4, like reference numerals are used for the parts which are identical with those shown in FIGURES 1 and 2. The view finder comprises the telescopes 24, 25 with the beam splitter systems 26a, 26b, 26c, and the magnifying lenses 24a, 24b for viewing the index plate 11. The prism 27 fulfills the functions of a deviating mirror and is disposed in the path of rays of the magnifying lenses. The wedge plate 12 having wedge-shaped protrusions 12a, 12b, 12c is associated with the image field boundaries 11a, 11b, 11c of the index plate 11. Guide rod 15 is connected with and to the wedge 12, its other end being hingedly connected with a feeling lever 23a connected with one end to lever arm 23c, its other end scanning the guide surface 2 of objective 1. The other end of lever arm 23c is connected with wedge plate 12 via support 14.

The wedge plate 12 can be displaced axially relative to the index plate. This movement is derived from the adjusting motion of objective 1 and it is transferred to the wedge plate by the feeling lever 23a scanning the guide surface 2, and via guide rod 15.

The wedge plate 12 can also be displaced horizontally together with the index plate 11. This is effected also following the focusing adjustment of objective 1 by feeling lever 23a scanning guide surface 2, and lever arm 23c connected with feeling lever 23a and wedge plate 12.

It will be understood that this invention is susceptible to modification in order to adapt it to different usages and conditions and, accordingly, it is desired to comprehend such modifications within this invention as may fall within the scope of the appended claims.

What we claim is:

1. In a photographic camera having an objective lens system and means for adjusting the same to various focussing distances: a view finder comprising a view finder lens system; a window in said camera; means for combining the light rays as directly observed by said view finder lens system, and those light rays entering the camera through said window, an index plate provided with apertures defining image field boundaries and disposed in the ray path from said window, means for viewing the image field boundaries provided on said index plate, and a wedge plate of transparent material disposed between said index plate and said light ray combining means and having on one of its large surfaces a plurality of wedge-shaped protrusions corresponding to such image field boundaries so that light rays passing through said apertures are subjected to refraction, means supporting said wedge plate for axial movement relative to said index plate, and means responsive to the setting of said objective lens system to various focussing distances for axially displacing said wedge plate relative to said index plate.

2. In a photographic camera having an objective lens system and means for adjusting the same to various focussing distances: a range finder comprising a view finder lens system; a window in said camera; a means for combining the light rays as directly observed by said view finder lens system and those light rays entering the camera through said window; an index plate provided with apertures defining frame-like configurations providing image field boundaries, means for producing an intermediate image in the plane in which said index plate is disposed, optical collimator lens means for viewing the intermediate image in the plane and the image field boundaries provided on said index plate, and a wedge plate of transparent material disposed between said index plate and said optical collimator lens means and having on one of its large surfaces a plurality of wedge-shaped protrusions corresponding to said apertures and forming a plurality of frame-like configurations of wedge-shaped cross-sections so that light rays passing through said apertures are subjected to refraction, means supporting said wedge plate for axial movement relative to said index plate, and means responsive to the setting of said objective lens system to various focussing distances for axially displacing said wedge plate relative to said index plate.

3. In a photographic camera having an objective lens system and means for adjusting the lens to various focussing distances: a range finder comprising a view finder lens system; a window in said camera; a means for combining the light rays as directly observed by said view finder lens system and those light rays entering the camera through said window, an index plate provided with apertures defining image field boundaries forming a rectangular frame, means for producing an intermediate image in the plane in which said index plate is disposed, optical collimator lens means for viewing the intermediate image in the plane and the image field boundaries provided on said index plate, and a wedge plate of transparent material disposed between said index plate and said optical collimator lens means and having on one of its large surfaces a plurality of wedge-shaped protrusions defining a rectangle corresponding to said frame so that light rays passing through said apertures are subjected to refraction; means for supporting said wedge plate for axial movement relative to said index plate, lever means including a feeling lever, said feeling lever contacting said focusing adjusting means of said objective lens system for transferring the adjusting motion of said objective lens system to said lever means, distance measuring means comprising a telescope objective and means for displacing said telescope objective, resilient means urging said means for displacing said telescope objective against said lever means, so as to cause said displacement means to follow the movement of said lever means, a pair of guide rods connected with one of their respective ends to said lever means and with the other of their respective ends to said wedge plate so as to transfer the movement of said lever means to said wedge plate and to displace the same axially with respect to said index plate in response to the adjusting motion of said objective lens system.

4. In a photographic camera having an objective lens system and means for adjusting the same to various focussing distances: a range finder comprising a view finder lens system; a window in said camera; a means for combining the light rays as directly observed by said view finder lens system and those light rays entering the camera through said window, an index plate provided with optical apertures defining image field boundaries, means for producing an intermediate image in the plane in which said index plate is disposed, optical collimator lens means for viewing the intermediate image in the plane and the image field boundaries provided on said index plate, and a wedge plate of transparent material disposed between said index plate and said optical collimator lens means and having on one of its large surfaces a plurality of wedge-shaped protrusions so that light rays passing through said apertures are subjected to refraction, means supporting said wedge plate for axial movement relative to said index plate, lever means, a feeling lever connected with said lever means, said feeling lever contacting said focusing adjusting means of said objective lens system and transferring the adjusting motion of said objective lens system to said lever means, a pair of guide rods connected with one of their respective ends to said lever means and with the other of their respective ends to said wedge plate, parallax compensating means, a lever arm connected at one end thereof to said feeling lever and at the other end to said parallax compensating means, whereby adjusting motion of said objective lens system is simultaneously transferred to said parallax compensating means and to said wedge plate thereby causing the latter to move axially with respect to said index plate in response to the adjusting motion of said objective lens system.

5. In a photographic camera as described in claim 1, compensating means for displacing said index plate along its plane of extension, said supporting means including a slidable member supporting said index plate and said wedge plate, said member having a guide surface on the side supporting said wedge plate allowing the latter to be displaced axially with respect to said index plate.

6. In a photographic camera having an objective lens system and means for adjusting the same to various focussing distances: a range finder comprising a view finder lens system; a window in said camera; a means for combining the light rays as directly observed by said view finder lens system and those light rays entering the camera through said window, an index plate provided with optical apertures defining image field boundaries, means for producing an intermediate image in the plane in which said index plate is disposed, optical collimator lens means for viewing the intermediate image in the plane and the image field boundaries provided on said index plate, and a wedge plate of transparent material disposed between said index plate and said optical collimator lens means and having on one of its large surfaces a plurality of wedge-shaped protrusions so that light rays passing through said apertures are subjected to refraction, means supporting said wedge plate for axial movement relative to said index plate, and means responsive to the setting of said objective lens system to various focussing distances for axially displacing said wedge plate relative to said index plate, a plurality of deflecting wedge elements associated with at least one of said image field boundaries of said index plate, said deflecting wedge elements being disposed at the light-receiving side of said index plate and having a power of refraction acting in the opposite direction to the power of refraction of said wedge-shaped protrusions on said wedge plate.

7. In a photographic camera as described in claim 6, said deflecting wedge elements being connected with said index plate.

References Cited in the file of this patent

UNITED STATES PATENTS

| | | |
|---|---|---|
| 2,157,548 | Leitz | May 9, 1939 |
| 2,341,410 | Mihalyi | Feb. 8, 1944 |
| 2,346,076 | Mihalyi | Apr. 4, 1944 |
| 2,353,257 | Mihalyi | July 11, 1944 |
| 2,805,608 | Leitz et al. | Sept. 10, 1957 |
| 2,900,887 | Nerwin | Aug. 25, 1959 |
| 2,919,623 | Tronnier | Jan. 5, 1960 |